United States Patent [19]

Rianda

[11] Patent Number: 4,792,374
[45] Date of Patent: Dec. 20, 1988

[54] APPARATUS FOR FUSION JOINING PLASTIC PIPE

[75] Inventor: Kent A. Rianda, Huntington Beach, Calif.

[73] Assignee: Georg Fischer AG, Schaffhausen, Switzerland

[21] Appl. No.: 34,895

[22] Filed: Apr. 3, 1987

[51] Int. Cl.$^4$ .................................................. B29C 65/02
[52] U.S. Cl. .................................... 156/503; 156/544; 156/556
[58] Field of Search .......................... 165/61, 77, 169; 156/304.2, 499, 503, 498, 158, 502, 544, 556; 264/248, 36, 327

[56] References Cited

U.S. PATENT DOCUMENTS

| | | | |
|---|---|---|---|
| 1,865,669 | 7/1932 | Bostwick | 156/503 |
| 1,962,845 | 6/1934 | Sideris | 165/169 |
| 1,969,840 | 8/1934 | Goddard | 228/222 |
| 2,357,170 | 8/1944 | Burggraf | 228/46 |
| 2,358,144 | 9/1944 | Catlett | 228/46 |
| 2,359,352 | 10/1944 | Bucknam et al. | 228/46 |
| 2,372,824 | 1/1946 | Lytle et al. | 228/46 |
| 2,381,274 | 8/1945 | Frostwick et al. | 219/10.51 |
| 2,505,647 | 4/1950 | Norris | 154/116 |
| 2,618,938 | 11/1952 | Booth et al. | 165/169 |
| 3,022,209 | 2/1962 | Campbell | 156/158 |
| 3,030,246 | 4/1962 | Westlake, Jr. | 269/52 |
| 3,143,628 | 8/1964 | Golden | 219/10.49 |
| 3,253,972 | 5/1966 | Huddleston | 156/304 |
| 3,276,941 | 10/1966 | Burns | 161/36 |
| 3,335,789 | 8/1967 | Raskin | 165/169 |
| 3,426,118 | 2/1969 | Chapman et al. | 264/230 |
| 3,426,119 | 2/1969 | Chapman et al. | 264/230 |
| 3,634,167 | 1/1972 | Plontke | 156/257 |
| 3,635,504 | 1/1972 | Borden | 285/260 |
| 3,666,586 | 5/1972 | Lacey | 156/98 |
| 3,677,845 | 7/1972 | Roberts | 156/3 |
| 3,707,428 | 12/1972 | Roberts | 156/583 |
| 3,749,621 | 7/1973 | Shoffner | 156/86 |
| 3,929,541 | 12/1975 | Spears et al. | 156/157 |
| 3,959,058 | 5/1976 | Rath et al. | 156/272 |
| 4,071,395 | 1/1978 | McElroy | 156/499 |
| 4,075,268 | 2/1978 | Nolan | 264/138 |
| 4,205,221 | 5/1980 | Meyer | 165/61 |
| 4,250,605 | 2/1981 | Chapman | 29/132 |
| 4,263,084 | 4/1981 | Takala | 156/503 |
| 4,288,266 | 9/1981 | Konrad et al. | 156/158 |
| 4,315,791 | 2/1982 | Ishii et al. | 156/304.2 |
| 4,349,397 | 9/1982 | Sturm | 156/64 |
| 4,352,708 | 10/1982 | McElroy | 156/378 |
| 4,362,684 | 12/1982 | Thalmann | 264/230 |
| 4,365,144 | 12/1982 | Reich et al. | 219/535 |
| 4,369,779 | 1/1983 | Spencer | 128/213 |
| 4,387,845 | 6/1983 | Mefford | 228/222 |
| 4,401,497 | 8/1983 | Warthmann | 156/267 |
| 4,407,691 | 8/1983 | Ishii et al. | 156/304 |
| 4,436,987 | 3/1984 | Thalmann et al. | 219/535 |
| 4,449,038 | 5/1984 | Reich et al. | 156/304.2 |
| 4,484,975 | 11/1984 | McElroy | 156/503 |
| 4,521,263 | 6/1985 | Benin et al. | 156/159 |
| 4,536,644 | 8/1985 | Thalman | 219/535 |
| 4,630,669 | 12/1986 | Kessler et al. | 219/10.49 |

FOREIGN PATENT DOCUMENTS 8002124 10/1980 World Int. Prop. O. ........ 156/304.2

OTHER PUBLICATIONS

Maxar Fusion Joints—Maxar Fep Teflon Pipe and Fittings.

*Primary Examiner*—Willard Hoag
*Attorney, Agent, or Firm*—Roberts and Quiogue

[57] ABSTRACT

Apparatus for butt-end joining two pieces of plastic pipe including an inflatable mandrel and heated clamping means for enclosing the abutted pipe ends over a first and second connection ends over the thermally controlled region which extends bilaterally beyond the melt region. This end-surrounding apparatus then cooperates both with a companion apparatus employed for the described internal support and with the unmelted longitudinally adjacent portions of the subject first and second connection ends both to prevent undesired deformational flow of melted component material and to bonding-conducively pressurize the softened component-to-component interface area.

14 Claims, 5 Drawing Sheets

APPARATUS FOR FUSION JOINING PLASTIC PIPE

BACKGROUND OF THE INVENTION

The disclosed invention generally relates to the joining of plastic piping system component connection ends, and is more particularly directed to apparatus and method for fusion joining such piping system connection ends for use in high purity applications where internal voids, crevices, cavities, or the like cannot be tolerated.

Plastic piping system components made from a variety of thermo-plastic materials are utilized in a wide range of applications as a result of the useful characteristics of thermo-plastic materials, which include resistance to corrosion, imperviousness to contamination, reduced cost, ease of installation, and lighter weight.

Known methods of joining plastic piping system components include the use of mechanical means, solvent cement, and/or heat fusion.

Examples of mechanical means include threaded couplings, compression fittings, and flanged fittings. An example of solvent cement joining would be the application of cement to a pipe end which is then inserted into a fitting or valve. An example of heat fusion is a butt joint between piping system component ends. Such butt joints tend to be weak, and various couplings have been devised for joining piping system components through the application of heat. A further example of heat fusion is socket fusion where heated piping system component ends are inserted into a coupling.

In high purity applications, such as the semiconductor industry, the food industry, the pharmaceutical industry, the biotechnical industry, and chemical manufacture, it is important that contamination be avoided. Mechanical joining techniques have been utilized in high purity applications, but require frequent disassembly for cleaning since the mechanical joining components have crevices and voids where contamination can be readily lodged.

The use of solvent cement presents a contamination problem since internal voids, crevices, or cavities are readily formed. Contamination or potentially contaminating material could readily be lodged in such voids, crevices, or cavities. Further, such voids, crevices, or cavities provide non-turbulent locations for the accumulation of food for bacteria and for the multiplication of bacteria.

The use of known heat fusion joining techniques in high purity applications also present contamination and bacteria problems in that unwanted voids, crevices, or cavities are readily formed. As a result, attempts have been made to provide for heat fusion joints which are smooth and free of voids, crevices and cavities on the inside. Such attempts have included the use of some form of inside support apparatus to support the piping system component connection ends when they are subjected to heat in the fusion process. For example, expandable mandrels which are inserted and then expanded to the inside diameter have been utilized. An important consideration with the use of internal support apparatus is the planning required to make sure that the support apparatus could be removed after the piping system components are joined. For example, if the piping system components being joined include right angle joints that have already been formed, removal could pose a problem. Also, the fact that support apparatus is inside the piping system components being joined poses the potential for contamination.

SUMMARY OF THE INVENTION

It would therefore be an advantage to provide a high purity plastic piping system component fusion joining technique which does not utilize couplings.

It would also be an advantage to provide a high purity plastic piping system component fusion joining technique which utilizes an easily removed and non-contaminating internal support.

It would also be an advantage to provide a high purity plastic piping system component fusion joining technique which can be reliably utilized on site at the location of installation.

Another advantage would be to provide for a high purity plastic piping system component fusion joining technique that provides for a joint that is internally smooth and free of contamination lodging voids and crevices.

Still another advantage would be to provide for a high purity plastic piping system component fusion joining technique which provides for the uncontaminated heat fusion of piping system component connection ends.

Still another advantage would be to provide a high purity plastic piping system component joining technique which may be used with readily oxidized thermo-plastic materials.

The foregoing and other advantages are achieved by the present invention which generally provides a method and associated apparatus for fusion joining first and second, substantially axially abutted, thermo-plastic piping system component connection ends. The invention first entails selectively supporting the inside surfaces of the subject connection ends with an outwardly radial force over an extent which is greater than a region, denominated the thermally controlled region, that includes the interface and terminal portions of the subject ends. The invention then secondly entails a longitudinally differentiated thermal driving of the thermally controlled region which includes a centrally located melt region, where the melt region is heated at least to its material softening point, while the bilateral, longitudinally adjacent portions of the thermally controlled region are affirmatively maintained at temperatures lower than the softening point, typically by diverting centrally applied, and otherwise longitudinally propagating, thermal energy away from these adjacent portions.

The provided inventive apparatus typically further includes apparatus for surrounding the first and second connection ends over the thermally controlled region which extends bilaterally beyond the melt region. This end-surrounding apparatus then cooperates both with a companion apparatus employed for the described internal support and with the unmelted longitudinally adjacent portions of the subject first and second connection ends both to prevent undesired deformational flow of melted component material and to bonding-conducively pressurize the softened component-to-component interface area.

More specific aspects of the invention provide for such additional features as internal support structures which are pressurizably configured for deflatable removability from piping system interior conduits, as well as thermal structures both for transferring applied thermal energy to the melt region and for dissipating divergent thermal energy away from the longitudinally adjacent portions. The thermal source is configured for the channeling of heating and coolintg fluids to chambers in thermal communication with, but physically separated from, the melt region. Alternatively, the applied thermal energy may be from sources such as clamp-on heating devices or intergrally formed heating elements. The invention also more specifically provides for longitudinal sectioning of the thermal transfer structure to facilitate overall application and removal. A support fixture for maintaining subject component ends in abutted alignment during a fusion joining operation is likewise more specifically provided.

BRIEF DESCRIPTION OF THE DRAWING

The advantages and features of the disclosed invention will readily be appreciated by persons skilled in the art from the following detailed description when read in conjunction with the drawing, in which common reference numerals identify elements common to the several figures wherein:

FIG. 6A is a longitudinally sectioned view of a portion of an alternative mandrel of the present invention, here including a heating element which is integrally formed, while

DETAILED DESCRIPTION

I. Introduction

A. Overview

Figure 1:
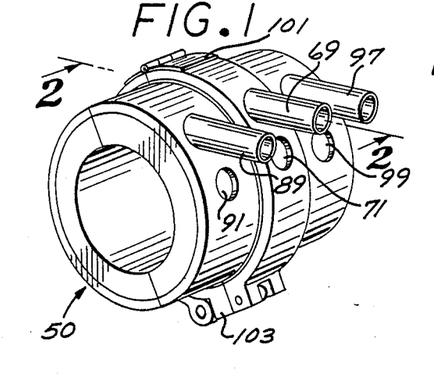
FIG. 1 is a perspective view of the heating and containment mandrel of the present invention.
Figure 3:
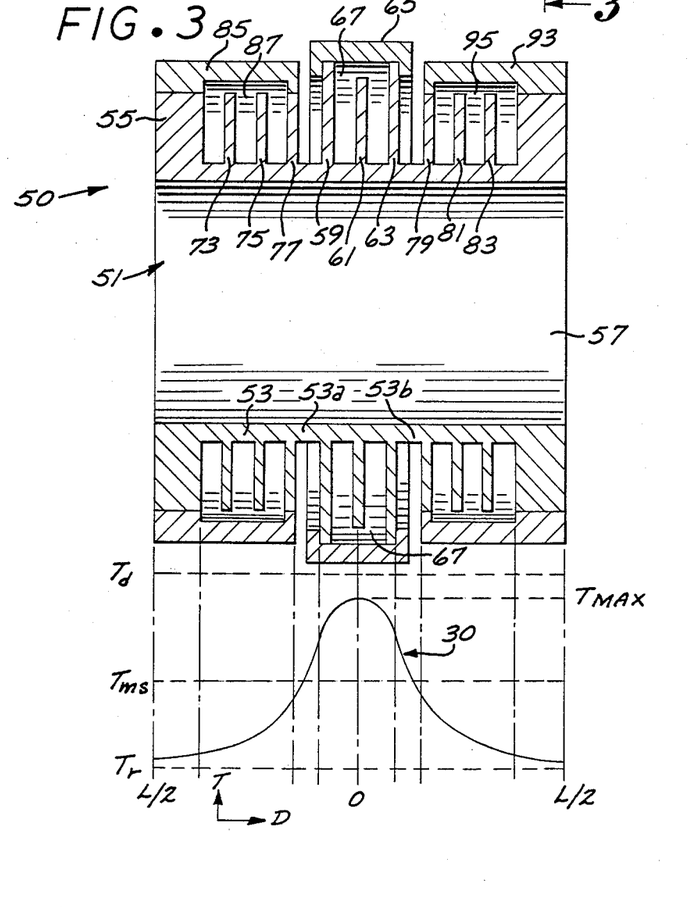
FIG. 3 is a longitudinally sectioned view of the mandrel of FIG. 1 and includes a graph of the temperature profile which the subject mandrel induces within subject abutted piping system ends.
Figure 4:
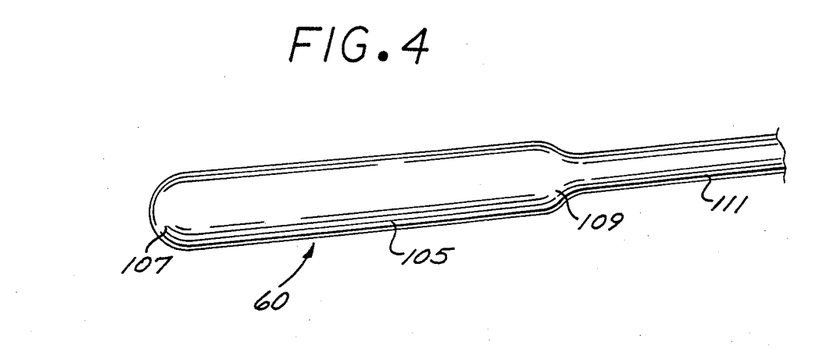
FIG. 4 is a perspective view of an inflatable bladder of the present invention which is utilized for internal piping support in conjunction with the mandrel of FIG. 1.
Figure 8:
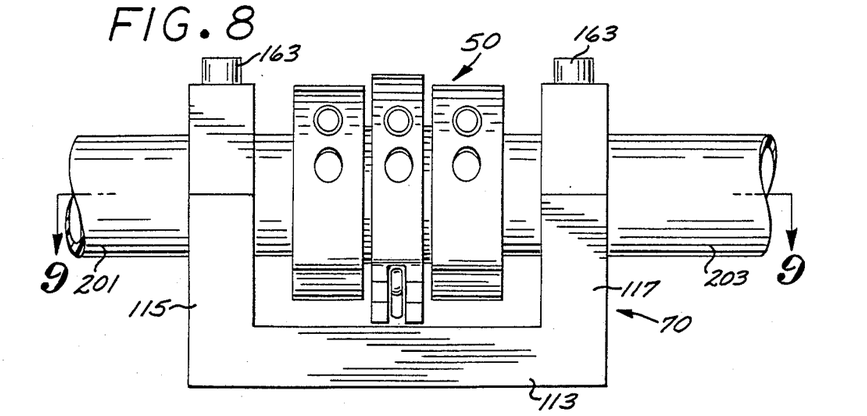
FIGS. 8 through 11 illustrate a clamping fixture and its use in conjunction with an inventive mandrel and inflatable bladder in joining subject piping system component connection ends.
Figure 9:
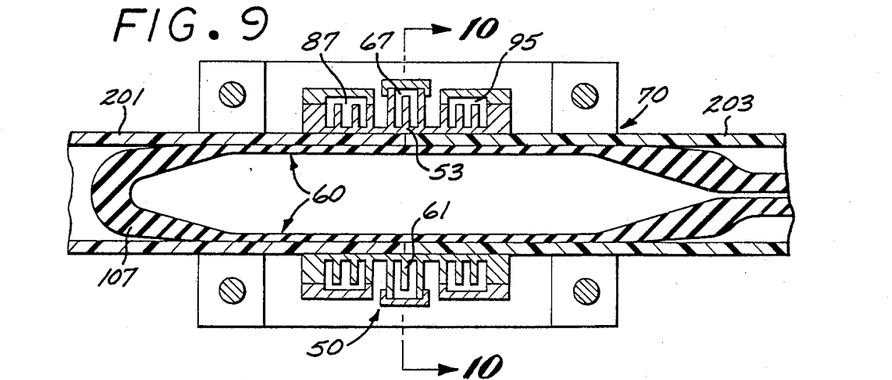
Figure 11:
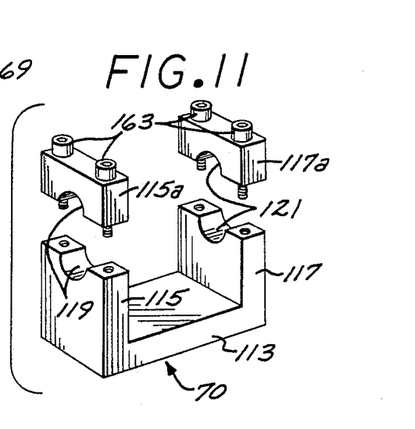

Included within the scope of the claimed invention are the illustrated example embodiments with which the U-shaped clamping fixture 70 of FIG. 11 is employed as in FIG. 8 to maintain the piping system ends 201 and 203 in abutted alignment, while the thermal control mandrel 50 of FIG. 1 is circumferentially applied to the piping exterior and the inflatable bladder 60 of FIG. 4 is supportively deployed as in FIG. 9 within the piping interior. The circumferentially disposed mandrel 50 in FIG. 9 crosssectionally includes the central heating channel 67 and the adjacent cooling channels 87 and 95, by means of which the temperature profile 30 of FIG. 3 is induced within subject abutted piping ends. At the same time that heat carried within central channel 67 drives the melt region of the abutted ends above its material softening point, cooling fluid carried by the outboard channels 87 and 95 causes adjacent piping portions to be affirmatively maintained below material softening. Alternatively, cooling of the piping portions longitudinally adjacent the melt region may be achieved by radiation into the surrounding air. A significant improvement in fusion process control and a consequential more uniform, higher quality fusion joint are thereby achieved.

B. Note on applicability

The connection ends to which the present invention relate include those of such piping system components as pipes, fittings and valves. The constituent piping materials with respect to which the fusion joining concepts of the present invention are then applicable include such thermo-plastic compositions as polypropylene, polyethylene, polybutylene, polyvinylidene fluoride (PVDF), perfluoralkoxy (PFA), ethylene-chlorotrifluoroethylene (ECTFE), polyvinyl chloride (PVC) and acrylonitrile butadiene styrene (ABS), as well as associated blends.

C. Note on Terminology

The referenced constituent materials are "thermoplastic" in that they exhibit thermal expansion when heated, and will flow at associated, material-specific temperatures known as "material-softening" points.

With regard more generally to subject inventive operations, the abutted terminal edges of subject connection ends are collectively denominated the "interface," while the general terminal region which encompasses both the interface and the terminal portions to be melted are collectively denominated the "melt region." The overall terminal portions of the subject connection ends subjected to heating and cooling heating are collectively called the "thermally controlled region" and includes the melt region centrally located therein.

II. Embodiment Details

Figure 2:
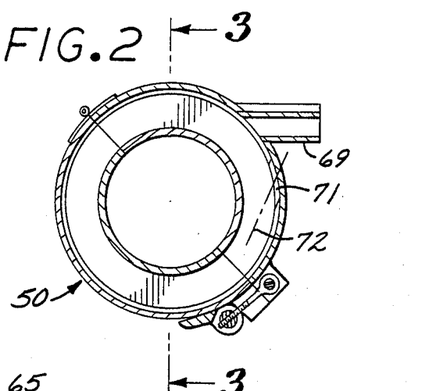
FIG. 2 is a transversely sectioned view of the mandrel of FIG. 1.

Referring now to FIGS. 1 through 3, included therein is one component of an apparatus for the fusion joining of first and second substantially axially-abutted piping system component connection ends. This component, which then serves as a means for practicing an associated step of a fusion joining method, is the heating enablement and melt containment mandrel 50 which itself includes an annular core 51. The annular core 51 includes a longitudinally extending thin wall 53 which terminates with thicker end wall portions 55 and forms a cylindrical bore 57 for accepting piping system component connection ends as detailed more fully further herein.

The heating nd containment mandrel 50 further includes external, centrally located, radially extending annular fins 59, 61, 63, where the center fin 61 is slightly radially smaller than the outside, centrally located fins 59, 63. A central annular cap structure 65 is secured over the outside, centrally located fins 59, 63 to form a central annular fluid conducting channel 67.

A central inlet pipe 69 is secured to the central annular cap 65, with the central axis of the inlet pipe 69 tangential to the approximate center of the central annular fluid conducting channel 67 and extending generally horizontally. An outlet opening 71 is formed in the annular cap structure 65 beneath the central inlet pipe 69. As illustrated in FIG. 2, the central axis 72 of the opening 71 is tangential to the approximate center of the central annular fluid conducting channel 67 and extends upwardly. The outlet opening 71 is positioned relative to the central inlet pipe 69 so as to allow fluid forced into the central fluid conducting channel 67 via the central inlet pipe 69 to travel almost full circle prior to having the opportunity to exit via the outlet opening 71. The opening of the central inlet pipe 69 and the outlet opening 71 are dimensioned to allow for rapid air movement within the central fluid conducting channel 67 with little pressure drop.

By way of example, the annular cap structure 65 may be secured by friction or with an appropriate high temperature adhesive.

The mandrel 50 further includes a first group of external, outboard, radially extending annular fins 73, 75, 77, and a second group of external, outboard, radially extending annular fins 79, 81, 83. The first and second groups of fins are respectively located on either side of the centrally located fins 59, 61, 63. The portions of the thin wall 53 between the centrally located fins and the groups of outboard fins are referred to as the bridge zones 53a, 53b.

An outboard annular cap structure 85 is secured over the first group of outboard fins 73, 75, 77, and bridges the innermost fin 77 and the adjacent thicker end wall 55 to form an outboard annular fluid conducting channel 87. An outboard inlet pipe 89 is secured to the outboard annular cap structure 85 in the same orientation as that of the central inlet pipe 69 to the central annular cap 65. The outboard annular cap structure 85 further includes an outlet opening 91 in the same orientation as that of the outlet opening 71 of the central annular cap 65. The opening of the outboard inlet pipe 89 and the outlet opening 91 are dimensioned to allow for rapid air movement within the outboard fluid conducting channel 87 with little pressure drop.

An outboard annular cap structure 93 is secured over the second group of outboard fins 79, 81, 83, and bridges the innermost fin 79 and the thicker end wall 55 to form an outboard annular fluid conducting channel 95. An outboard inlet pipe 97 is secured to the outboard annular cap structure 93 in the same orientation as that of the central inlet pipe 69 to the central annular cap 65. The outboard annular cap structure 93 further includes an outlet opening 99 in the same orientation as that of the outlet opening 71 of the central annular cap 65. The opening of the outboard inlet pipe 97 and the outlet opening 99 are dimensioned to allow for rapid air movement within the outboard fluid conducting channel with little pressure drop.

With respect to the described fluid conducting channels 67, 87 and 95, inner wall 53, in conjunction with the other relevant portions of the mandrel 50 which define channels 67, 87 and 95, serves to separate a subject thermally controlled region from associated received forced fluid.

The entire heating and containment mandrel 50 is longitudinally sectioned to allow for selective transverse separation. Each section thus includes semi-circular openings for accommodating the piping system component connection ends. For ease of securing the mandrel 50 about piping system component connection ends, a hinge 101 is secured to the outside of the central annular cap structure 65 to allow the transverse sections of the mandrel 50 to be hingedly opened and closed. A locking mechanism 103, schematically shown as a toggle bolt assembly, may be secured to the central annular cap 65 diametrically opposite the hinge 101. The locking mechanism 103 functions to secure the mandrel 50 about the piping system component connection ends 201, 203 to be joined, as shown in FIG. 8.

When mandrel 50 is disposed circumferentially encompassing a subject thermally controlled region, it is then more formally regardable as a thermal transfer structure which may both (1) transfer applied material softening thermal energy to the melt region in the central portion of the thermally controlled region, and (2) effectively divert away from the bilateral, longitudinally adjacent portions of the thermally controlled region that energy applied to the region center which by longitudinal propagation would otherwise elevate such adjacent portions to above the point of material softening. A subsequently described longitudinally differentiated thermal driving of the thermally ciontrolled region may then be carried out by simultaneously (1) applying to this thermal transfer structure material softening thermal energy for the subject center portion of the thermally controlled region while (2) cooling the subject adjacent portions by diverting away the described propagating energy.

From the discussion in various preceding paragraphs it is apparent that mandrel 50, as a thermal transfer structure of the described nature, is more specifically configured for essentially individual fluidic communicability with three mandrel transfer sections—specifically the portions of mandrel 50 which define relevant segments of channels 67, 95 and 87—which longitudinally are essentially successively disposed and which radially are essentially adjacent to and separated from the described melt region and the longitudinally adjacent portions of the thermally controlled region. In the particular context of this more specific configuration, moreover, the process of simultaneously applying softening energy for the melt region while cooling the longitudinally adjacent portions more specifically includes the process of applying material softening hot fluid to the central one of the indicated transfer sections while applying cooling fluid to the other two of the transfer sections.

With regard to the intrinsic composition of the annular cap structure 65, 85 and 93, the actual materials employed are typically not critical to the fusion process. Thermal transfer between injected air streams and the associated portions of mandrel 50, however, can be significantly increased by utilizing a highly thermal conductive metal, such as a suitable grade of aluminum. Such high conductivity would consequently reduce likewise associated heating and cooling times. In many cases, and especially with regard to central cap 65, an optimal configuration would entail the use of a laminate having first the highly conductive material on its inner, channel-facing surfaces and then a suitable insulating material on its exterior surfaces. Alternatively, simply annodizing the exterior surface of a single layered aluminum cap may in many cases provide a readily achieved improvement over unsupplemented aluminum.

The central core 51 is preferably made of a metal with a thermal conductivity in the range exhibited by copper with the highest to stainless steel with the lowest values. Also, different portions of the central core 51 may be made of different metals in order to achieve desired thermal conductivities. As discussed more fully herein, selection of the metal utilized for the central core 51 may allow for a mandrel without the outboard annular caps 85, 93 over the outboard fins.

With the exception of the bridge zones 53a and 53b, the thickness of the thin central wall 53 of the central core 51 is in general not critical to the fusion process and is preferably made as thin as practicable so as to reduce the thermal mass of the mandrel 50, which reduces the heating and cooling times in use and also reduces heat transfer to the ends of the mandrel 50. The minimum thickness would be that which would afford sufficient strength to the mandrel to prevent deformation when in the clamping mode. In contrast, the radial thickness of the bridge zones 53a, 53b is in fact critical to the fusion process and should be proportional to the size of the mandrel. Particularly, the radial thickness of the bridge zones 53a, 53b should be about 3% of the inside diameter of the cylindrical bore 57 for all size piping.

By way of examples, dimensions for a mandrel 50 for use with nominal 25 millimeter (mm) size piping may be as follows. The inside diameter of the cylindrical bore 57 is 0.984 inches or equal to the largest expected dimension for the pipe outside diameter based on its manufacturing tolerances. The outside diameter of the mandrel 50 at the end walls 55 and at the first and second groups of outboard fins is 1.50 inches. The outside diameter at the radially larger outside centrally located fins 59, 63 is 1.75 inches, and the outside diameter of the center centrally located fin 61 is 1.60 inches. The longitudinal length of the mandrel 50 is 1.75 inches.

The longitudinal thickness of each of the fins is about 0.040 inches. The spacing between the centrally located fins is 0.090 inches, and the spacing between the fins in the first and second groups of outboard fins is also 0.090 inches. The distance between the end walls 55 and the outside outboard fins 73, 83 is 0.090 inches. The longitudinal length of the end walls is 0.20 inches. The length of each of the bridges 53a, 53b, measured along the longitudinal direction is 0.140 inches. The thickness of the thin central wall 53 of the central core 51 is about 0.035 inches. The radial thickness of the bridge zones 53a, 53b is about 0.030 inches for 25 mm size piping, or approximately 3% of the inside diameter of the cylindrical bore 57 for all size piping.

The heating and containment mandrel 50 enables a longitudinally differentiated thermal driving of the thermally controlled region of the piping system component connection ends which are to be fusion joined. In accordance with this thermal driving, the longitudinally central melt region is heated at least to its material softening point while the bilateral, longitudinally adjacent portions of the thermally controlled region are affirmatively maintained at temperatures lower than the softening point. A thermal driving of this nature induces within a subject thermally controlled region a heat profile of the type which is schematically illustrated in FIG. 3 by curve 30. In actual practice, the induced heat profile is subject to various limiting considerations, and so the various steps of the provided inventive method and the associated components to the provided inventive apparatus are typically preselected so that the resultant profile conforms to predetermined operational criteria, as will subsequently be more fully discussed.

The more specific regard to the graphical portion of FIG. 3, the vertical axis T represents temperature and the horizontal axis D represents distance from the center of the mandrel 50. The symbol $T_{ms}$ represents the material softening point of the thermo-plastic material of the piping system component connection ends to be joined and the symbol $T_d$ represents the decomposition temperature of such thermo-plastic material. The symbol $T_{max}$ represents the maximum temperature of the melt region, and the symbol $T_r$ represents room temperature. The symbol L/2 represents one-half the length L of the mandrel 50. The melt region is represented by the portion of the temperature profile that is greater than the material softening point $T_{ms}$. As shown, the length of the melt region is less than the length L of the mandrel 50.

As shown in FIG. 3, the predetermined temperature profile 30 has a maximum in the center of the melt region, and continuously and generally symmetrically decreases with distance from the center. The predetermined temperature profile 30 provides for a smooth transition between temperatures below the material softening point and temperatures above the material softening point. The maximum temperature $T_{max}$ must be less than the decomposition temperature $T_d$ of the thermo-plastic material of the piping system component connection ends being joined. The predetermined temperature profile in FIG. 3 resembles a "witch" curve that is utilized in road construction.

The predetermined temperature profile 30 is achieved by introducing forced hot air into the central fluid conducting channel 67 via the inlet pipe 69, and introducing forced cooler air in the outboard conducting channels 87, 95 via the inlet pipes 89, 97. As mentioned previously, the outboard annular caps 85, 93 may not be necessary when the central core 57 is made of certain metals. If the outboard annular caps 85, 93 are not utilized, then the forced cooler air would not be provided. The temperature of the forced hot air would depend on the thermoplastic material of the subject piping system component connection ends to be joined, while temperature of the forced cooler air should be in what may be considered room temperature range, for example, in range of 60° F. to 80° F. A wider temperature range for the forced cooler air could be used with a corresponding adjustment to the temperature of the forced hot air.

If the core 51 is made of a metal having a relatively higher thermal conductivity, such as aluminum, then it would be preferable to utilize the outboard annular caps 85, 93 and the forced cooler air. If the core 51 is made of a metal having a relatively lower thermal conductivity, such as stainless steel, then it may be appropriate to not utilize the outboard annular caps 85, 93 and allow cooling by radiation in ambient air, provided that the ambient air is not extremely hot or cold. Where the ambient air is extremely hot or cold, the use of the outboard annular caps 85, 93 and forced air cooler air may be appropriate, even with a core 51 made of a metal having a relatively lower thermal conductivity.

Referring now to FIG. 4, schematically included therein is another component of an inventively provided apparatus for the fusion joining of first and second, substantially axially abutted piping system component connection ends. This component, which then similarly serves as a means for practicing an associated step of a likewise inventively provided fusion joining method, is the generally cylindrical, selectively pressurized, inflatable bladder 60 which is resiliently configured for conforming to the inside surfaces of a subject melt region. Bladder 60 includes a side wall 105 and end walls 107, 109 at each end. The end wall 107 is closed while the end wall 109 includes a small opening that is in communication with the inside of a tube 111 that is attached to the end wall 109. The outside surfaces of the bladder 60 should be very smooth to provide for a crevice free joint of subject piping system connection ends.

Preferably, the side wall 105 and the end walls 107, 109 are integrally formed of a material that can withstand temperatures in the range of the highest melting points of the thermo-plastic material of the piping system components contemplated for use with the invention. The bladder material should also resist fatigue with repeated inflations, and should be sufficiently elastic to passed through a 90 degree elbow or a T-fitting. Further, the material of the bladder 60 should minimize its action as a heat sink. By way of example, the bladder 60 may be made of a silicone or fluorosilicon elastomer. The tube 111 may be made of an appropriate plastic of suitable conventional composition, and may be fabricated integrally with the bladder 60 from the same piece of material as, for example, in a common molding operation.

By way of example, the length of the bladder 60 is slightly greater than the length of the mandrel 50 so that bladder 60 may be employed to selectively support the inside surfaces of subject first and second piping system ends with an outwardly radial force over a region that longitudinally greater than a subject thermally controlled region. The outside diameter of the bladder 60 may be about seven-eighths ($\frac{7}{8}$) of the inside diameter of the pipe size with which it is to be used. The thickness of the side wall 105 may be about one-half ($\frac{1}{2}$) of the wall thickness of the pipe size with which it is to be used, while the thickness of the end walls 107, 109 may be about one-sixth (1/6) of the outside diameter of the bladder 60.

Figure 5:
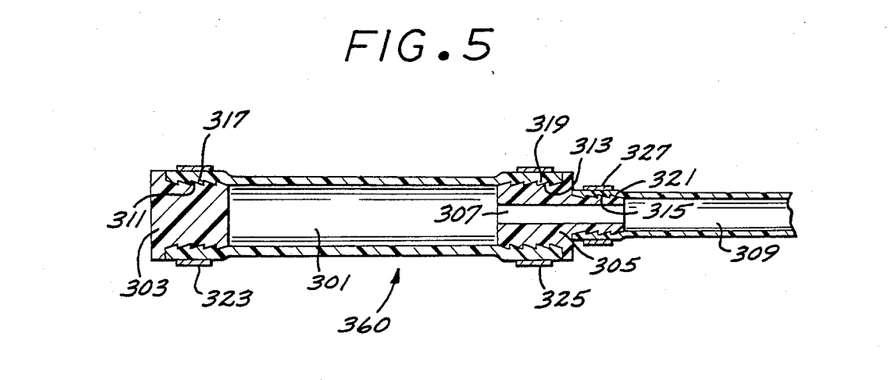
FIG. 5 is a longitudinally sectioned view of an alternative embodiment of a subject inflatable bladder.

The cross-sectional details of an alternative embodiment of an internal support mechanism of the inflatable bladder variety are presented in FIG. 5. Here the support mechanism 360, instead of being integrally formed, includes a flexibly tubular intermediate portion 301 which is mounted between the rigid end plugs 303, 305. In itself, the circumferential side wall of the flexible portion 301 is again suitably configured for pressurizable expandability into the required supportive contact with a subject encompassing thermally controlled region. Pressurization gases selectively reach the intermediate portion 301 through the central bore 307 axially formed in the end plug 305. Such gases are applied to bore 307 by means of a supply tube 309, to which plug 305 is in turn coupled.

Separation of the various components in mechanism 360 from one another during pressurization is prevented through the employment of reinforced serrated interfaces. The plugs 303, 305 accordingly respectively carry the circumferentially formed serrations 311, 313, 315, which then interface with the companionly configured serrations 317, 319, 321 formed in the respective ends of the intermediate portion 301 and the supply tube 309. Reinforcement for the three illustrated interfaces is provided by respective clamping bands 323, 325, 327.

The various elements of the described mechanism 360 may individually be composed of otherwise convention materials suitable to the associated described structural and operational functions. By way of example, the flexible intermediate portion 301 may again be formed of a silicone or fluorosilicone elastomer, the plugs 303, 305 may be formed of an appropriate rigid plastic, and the bands 323, 325, 327 may be metal. Basic dimensions for intermediate portion 301 may be the sme as those previously discussed in conjunction with bladder 60.

Figure 6A:
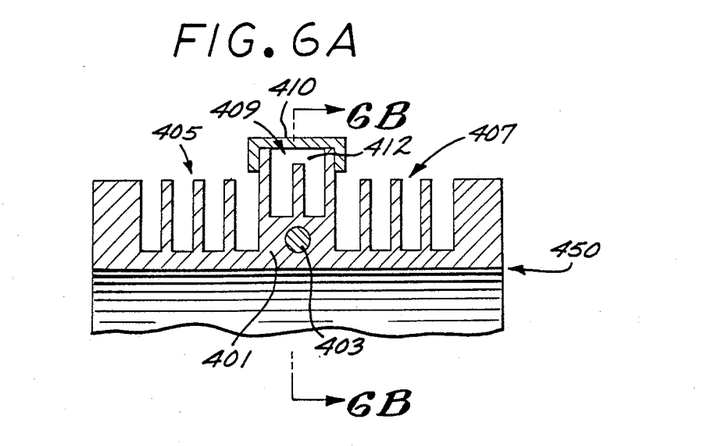
Figure 6B:
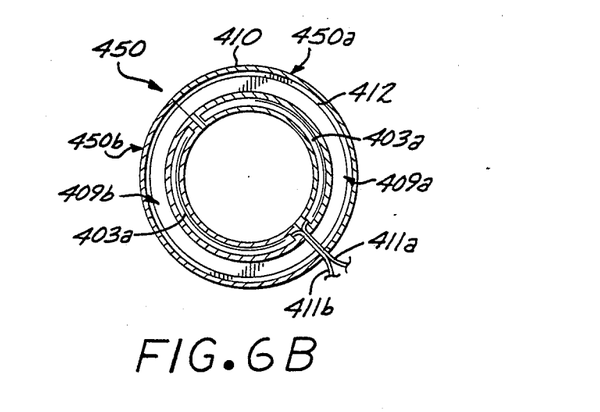
FIG. 6B is an associated transversely sectioned view showing companion semi-circular nature of the subject heating element.
Figure 7A:
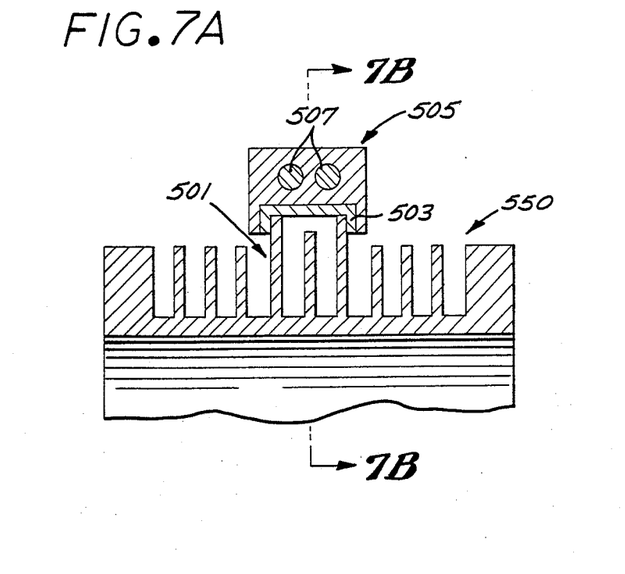
FIG. 7A is a longitudinally sectioned view of a portion of yet another mandrel of the present invention, here configured for physically interfaced heating by a clamp-on heating unit, further details of which appear in the transversely sectioned view of FIG. 7B.
Figure 7B:
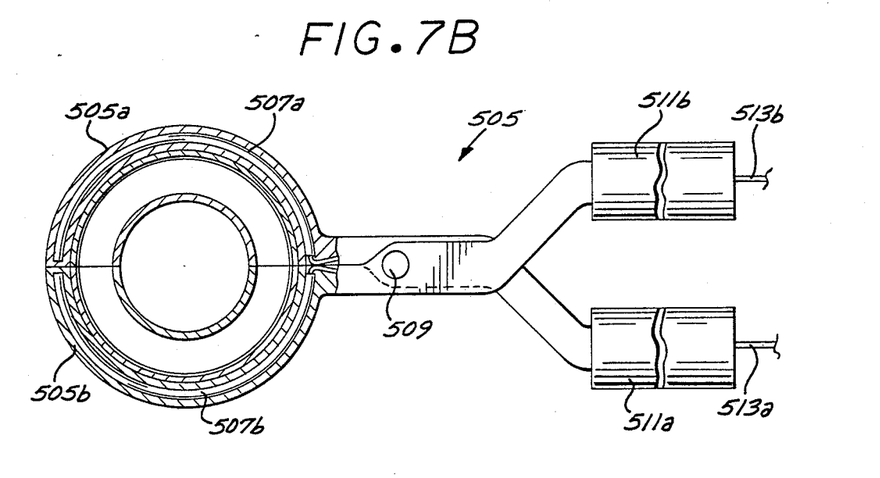

As previously discussed, the mandrel 50 of FIGS. 1 through 3 is configured to be heated by the fluid channeling of applied hot air. In contrast, the mandrels 450, 550 of the several FIGS. 6 and 7 are alternatively configured for heating by hardware elements disposed in structural contact with the cental heat transfer portions of the mandrels. Thus, with reference to the longitudinally sectioned view of FIG. 6A, the illustrated central heat transfer portion 401 carries a physically integral heating element 403, by means of which material softening thermal energy is applied to portion 401 and, hence, in turn to the associated piping melt region. The element 403, together with subsequently discussed electrical connections, may be of suitable conventional composition.

As with the mandrel 50, the mandrel 450 again includes the respective outboard groups of cooling fins 405, 407 which serve to dissipate accumulated heat both during and after the performance of a fusion operation. Further like the mandrel 50, the mandrel 450 includes a central group of fins 409 and a central annular cap structure 410 which forms a central annular fluid conducting channel 412. The central annular fluid conducting channel 412 is utilized to conduct cooling fluid during post-fusion cooling of the mandrel 450. The post fusion cooling fluid, which by way of example can be forced cool air, would be introduced for example with an inlet pipe (not shown) similar to the inlet pipe 69 of the mandrel 50. An outlet opening (not shown) similar to the outlet opening 71 of the mandrel 50 would allow for the exit of circulated cooling fluid. Especially in view of the integrally present nature of heating element 403, the use of forced post fusion cooling fluid functions to significantly increase the post-fusion rate at which residual heat within central portion 401 in general and within element 403 itself is transferred away from the mandrel 450 into the available ambient atmosphere.

The general disposition of heating element 403 in relation to other mandrel components is further illustrated in a transversely sectioned view taken along axis 6B—6B in FIG. 6A and presented schematically in FIG. 6B. With the mandrel 450 again separably configured in the form of the two mated semi-circular sections 450a and 450b, element 403 companionly takes the form of semi-circular heating components 403a and 403b. The respectively associated electrical connections 411a and 411b, as well as portions of the neighboring central cooling fins 409a and 409b, are also shown in the figure.

In the additional alternative mandrel 550 shown in the longitudinally sectioned view of FIG. 7A, a central fin group 501 provides a heat injection function during fusion, and further provides a heat dissipation function during post-fusion cooling. A highly thermally conductive annular cap 503 is secured about the central fin group in a manner similar to the previously discussed cap 65 of the mandrel 50 in FIG. 3. The annular cap 503 is heated by a companion independent heating unit 505 which is configured to physically interface with the annular cap 503. Serving as the actual sources of heat are the heating elements 507 integrally formed within unit 505. A transverse sectioning along the 7B—7B axis in FIG. 7A leads to the schematic view of FIG. 7B. Heating unit 505 is shown embodied in a scissors-type, mated semi-circular form which includes the portions 505a and 505b which interface with a given mandrel and which are mutually, manually leveraged through pivot 509 by companion handle sections 511a and 511b. Suitable electrical connections 513a and 513b pass through the respective handles and interface with the semi-circular heating segments 507a and 507b.

Post-fusion cooling of the mandrel 550 is achieved by circulating cooling fluid, via structure similar to that shown in the mandrel 50, within the fluid conducting channel formed by the annular cap 503.

Referring now to FIGS. 8 through 11, shown therein is a clamping fixture 70 for clamping the piping system component connection ends 201, 203 to be joined. It includes a squared, U-shaped base having a bottom wall 113 and parallel end walls 115, 117 orthogonal thereto. The end walls 115, 117 include openings 119, 121. The end walls 115, 117 are transversely sectioned so that the top portions 115a, 117a of the end walls may be removed to accept the subject piping system ends 201, 203 to be joined. The respective sections of each of the end walls include semi-circular openings. The top end wall portions 115a, 117a are secured by threaded fasteners 163 which are on either side of the openings 119, 121.

Figure 10:
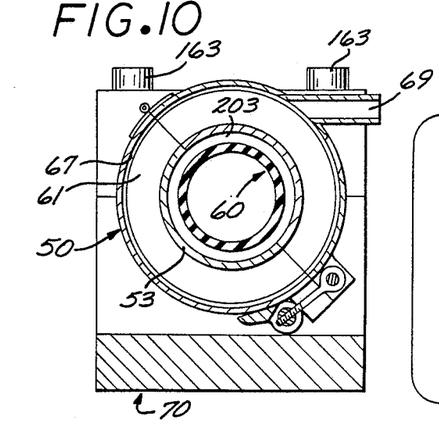

The purpose of the clamping fixture 70 is to maintain the subject ends to be joined in abutted, axial alignment, with the prevention of a longitudinally separational translation of one piping system end relative to the other being an important functional objective of the clamping fixture 70. The various elements of the resultant operational configuration of FIG. 8 are further shown in the longitudinally sectioned view of FIG. 9, as well as in the view of FIG. 10, which represents a transverse sectioning of the overall apparatus along the axis 10—10 in FIG. 9. Again appearing in FIGS. 9 and 10 are thin interior wall 53 and heating fin 61 of mandrel 50, along with other features previously and subsequently discussed.

The foregoing described mandrel 50, inflatable bladder 60 and clamping fixture 70 are utilized as follows to join piping system component connection ends 201, 203. The subject ends 201, 203 to be joined are secured in fixture 70 with their terminal edges in abutment, and with the interface generally centered between the parallel end walls 115, 117. The uninflated bladder 60 is then placed within the subject piping system connection ends 201, 203, and is generally centered at the interface. Alternatively, the uninflated bladder 60 may be placed within the subject ends 201, 203 prior to being secured in abutment in the clamping fixture 70. The bladder 60 is then inflated to a pressure sufficient to prevent inward deformational flow of melted thermo-plastic materials. The actual pressure utilized will tend to be dependent upon the inate characteristics of the given operational situation. A pressure of about 30 pounds per square inch (PSI) to about 100 PSI would be typical.

The mandrel 50 is then secured about the connection ends 201, 203 so that it is centered on the interface, as shown in FIG. 9. It should be appreciated that as a further alternative, the mandrel 50 may be secured about the subject ends 201, 203 prior to insertion and inflation of the bladder 60.

The mandrel 50 is then differentially driven as discussed previously by introducing forced hot air into the central fluid-conducting channel 67 and, where appropriate, introducing forced cooler air into the outboard fluid-conducting channels 87, 95.

Upon the application of heat, the piping system ends 201, 203 begin to melt, first on their exterior surfaces next to the interface. As the heating continues, the melt region grows longitudinally and also radially inward across the walls of the subject ends 201, 203. As the thermo-plastic material of the melt region of the subject ends 201, 203 heats and melts, it thermally expands. The thermally expanding and melting thermo-plastic material is contained by the inside surface of the bore 57 of the mandrel 50, the outside surface of the pressurized bladder 60, and the unmelted portions of the subject piping system ends 201, 203, as a result of being secured in the clamping fixture 70. The thermal expansion and the containment together bring about a pressurization which induces an intermingling of the softened polymeric chains at the interface.

By way of example, the following Table I sets forth hating and cooling parameters which may be utilized in conjunction with 25 mm PVDF pipe:

TABLE I

| (A) | Fusion Interval | |
|---|---|---|
| | (1) Central Fluid Channel 67: | |
| | Heating Air Temperature | 650 Degrees F. |
| | Heating Air Flow | 15 Liters/Min |
| | Heating Time | 3 Minutes |
| | (2) Outboard Fluid Channels 87, 95: | |
| | Cooling Air Temperature | 72 Degrees F. |
| | Cooling Air Flow | 1.5 Liters/Min |
| (B) | Post-Fusion Cooling Interval | |
| | All Fluid Channels 67, 87, 95: | |
| | Cooling Air Temperature | 68 Degrees F. |
| | Cooling Air Flow | 30 Liters/Min |
| | Cooling Time | 30 Seconds |

In the above Table I, it may be noted that the indicated Post-Fusion cooling time of 30 seconds is a typical period to reach a reasonable disassembly temperature of less than 100 degrees F. It may also be noted that the suggested Post-Fusion cooling flow rate of 30 liters/min is to be approximately twice that of the Fusion Interval heating flow rate. It may be further noted parenthetically that Post-Fusion rate of cooling seems to have no effect on the joint-making process.

With more general regard now to the basic described technique of fusion joining piping system component connection ends with the disclosed apparatus, the induced longitudinal temperature profile and the total heating time are controlled so that the walls of the subject connection ends are completely melted through to the surface of the bladder 60 and over the region that extends from the center of the mandrel to about half the distance to the ends of the mandrel 50. If the heating time is too short, only the radially outside portions of the connection ends will be fused, resulting in a weak joint and a crevice around the inside circumference of the interface.

If the heating time is too long, the melt zone on the exterior of the piping system component connection ends eventually reaches the ends of the mandrel 50, and melted thermo-plastic material begins to exude out the ends of the mandrel 50, forming a ring at each mandrel end. The longitudinal flow reduces the thickness of the pipe wall in the joint area due to loss of material, and the net result is a weaker joint.

If the temperature profile provides too steep a gradient between the hot and cooler regions, internal stresses may be created in the joint, resulting in a brittle joint.

If the temperature profile is too flat, the exterior of the piping system component connection ends will melt out of the ends of the mandrel 50 before the melt region has extended through to the interior surface of the end walls, resulting in a thin wall.

The resulting fusion joint should be visually inspected. If undesired imperfections are found, appropriate adjustments in the temperature profile and heating time, would be effected. The governing profile and heating time will tend to be dependent upon the type of thermo-plastic being joined, the material of the mandrel 50, and the actual temperatures utilized.

It should be noted that if there is a slight looseness of subject connection ends in the mandrel 50, the ends will thermally expand in response to heating until they contact the inside surface of the bore 57, and the process continues as described above. If the looseness is greater, the heating time must be extended to compensate. Obviously, at some point the looseness would be too great and a different size of mandrel would have to be used.

While the foregoing has generally been directed to the fusion jointure of abutted piping system component connection ends, it has been observed that precise abutment is not necessary and a small gap at the interface may be tolerated. Also, slightly non-square cuts may be tolerated. However, it should be recognized that any gap at the interface reduces the amount of material available for the fusion joint. Further, precise circumferential alignment is not required, and the piping system component connection ends do not have to be precisely identical in circumference. Thus, substantial axial abutment and substantial circumferential alignment may be sufficient.

Preferably, however, the ends of the piping system component connection ends to be joined should be cut square withoiut any beveling of the terminal faces. Any such beveling would only serve to reduce the thermoplastic material available for the fusion joint.

The foregoing described invention provides many advantages including the following. A particularly important advantage is the reliable provision of crevice free and bead free thermo-plastic fusion joints. A further important advantage is that the disclosed technique can be easily and reliably utilized on site at the location of installation to provide for crevice free and bead free thermo-plastic fusion joints.

Although the foregoing has been a description and illustration of specific embodiments of the invention, various modifications and changes thereto can be made by persons skilled in the art without departing from the scope and spirit of the invention as defined by the following claims.

What is claimed is:

1. An apparatus for fusion joining first and second, substantially axially abutted piping system component connection ends, comprising:

support means, internal to the subject first and second piping system ends, for controllably producing an outwardly radial force against the inside surfaces of the subject first and second ends over a region that is longitudinally greater than a melt region which includes the interface and terminal portions of the subject ends; and heat enabling means (1) for surrounding the subject first and second piping system ends over a thermally controlled region extending longitudinally and bilaterally beyond the melt region which is substantially centrally located therein, and (2) for enabling a longitudinally differentiated thermal driving of the thermally controlled region in which the melt region is heated at least to its material softening point while the bilateral, longitudinally adjacent portions of the thermally controlled region are affirmatively maintained at temperatures lower than the softening point, said heat enablement means cooperating with said internal support means and the unmelted portions of the subject first and second ends to contain the melt region, said heat enabling means comprising:

(a) a longitudinally centrally located annular channel for receiving material softening hot forced fluid and for separating the melt region from the received forced fluid, said centrally located annular channel thermally transferring thermal energy to said melt region; and (b) thermally conductive fins internal to said centrally located channel.

2. An apparatus for fusion joining first and second, substantially axially abutted piping system component connection ends, comprising:

support means, internal to the subject first and second piping system ends, for controllably producing an outwardly radial force against the inside surfaces of the subject first and second ends over a region that is longitudinally greater than a melt region which includes the interface and terminal portions of the subject ends; and heat enabling means (1) for surrounding the subject first and second piping system ends over a thermally controlled region extending longitudinally and bilaterally beyond the melt region which is substantially centrally located therein, and (2) for enabling a longitudinally differentiated thermal driving of the thermally controlled region in which the melt region is heated at least to its material softening point while the bilateral, longitudinally adjacent portions of the thermally controlled region are affirmatively maintained at temperatures lower than the softening point, said heat enablement means cooperating with said internal support means and the unmelted portions of the subject first and second ends to contain the melt region, said heat enabling means comprising:

(a) a longitudinally centrally located annnular channel for receiving material softening hot forced fluid and for separating the melt region from the received forced fluid, said centrally located annular channel thermally transferring thermal energy to said melt region; and (b) cooling fins on either side of said centrally located annular channel.

3. An apparatus for fusion joining first and second, substantially axially abutted piping system component connection ends, comprising:

support means, internal to the subject first nd second piping system ends, for controllably producing an outwardly radial force against the inside surfaces of the subject first and second ends over a region that is longitudinally greater than a melt region which includes the interface and terminal portions of the subject ends; and heat enabling means (1) for surrounding the subject first and second piping system ends over a thermally controlled region extending longitudinally and bilaterally beyond the melt region which is substantially centrally located therein, and (2) for enabling a longitudinally differentiated thermal driving of the thermally controlled region in which the melt region is heated at least to its material softening point while the bilateral, longitudinally adjacent portions of the thermally controlled region are affirmatively maintained at temperatures lower than the softening point, said heat enablement means cooperating with said internal support means and the unmelted portions of the subject first and second ends to contain the melt region, said heat enabling means comprising:

(a) a longitudinally centrally located annnular channel for receiving material softening hot forced fluid and for separating the melt region from the received forced fluid, said centrally located annular channel thermally transferring thermal energy to said melt region; and (b) further annular channels displaced from and on either side of said centrally located channel for receiving forced fluid having a temperature less than the material softening point of the thermoplastic material of the melt region.

4. The fusion joining apparatus of claim 3 wherein said centrally located annular channel and said further annular channels include internal thermally conductive fins.

5. An apparatus for fusion joining first and second thermoplastic piping system component connection ends, comprising:

securing means for securing the first and second piping system component connection ends in substantially abutted, axial alignment without positive axial pressure and for preventing axial displacement of the piping system component connection ends during the fusion process;

a containment mandrel for surrounding the first and second piping system connection ends, substantially without positive pressure, over a thermally controlled region which includes (a) a melt region located substantially centrally therein and extending from the outside surfaces to the inside surfaces of the connection ends, and (b) bilateral longitudinally adjacent portions on either side of said melt region;

centrally located heating means thermally coupled to said containment mandrel for applying thermal energy to heat said melt region at least to its material softening point;

first and second cooling means on either side of said centrally located annular channel for dissipating heat to maintain said bilateral longitudinally adjacent portions at temperatures lower than the material softening point; and a pressurizable bladder internal to the first and second connection ends and extending bilaterally beyond the melt region;

said pressurizable bladder being pressurized to cooperate with (a) said containment mandrel and (b) said bilateral longitudinal adjacent portions of the correction ends which remain solid and held in place by said securing means to prevent the displacement of said melt region in all directions which would otherwise result from the thermal expansion of said melt region, whereby pressure is developed in the softened melt region to induce intermingling of the softened thermoplastic material of said melt region.

6. The fusion joining apparatus of claim 5 wherein said first and second cooling means comprise cooling fins on either side of said centrally located annular channel.

7. The fusion joining apparatus of claim 5 wherein said centrally located annular channel includes internal thermally conductive fins.

8. The fusion joining apparatus of claim 5 wherein sid first and second cooling means comprise further annular channels displaced from and on either side of said centrally located annular channel for receiving forced fluid having a temperature less than the material softening point of the thermoplastic material of the melt region.

9. The fusion joining apparatus of claim 8 wherein centrally located annular channel and said further annular channels include internal thermally conductive fins.

10. An apparatus for fusion joining first and second thermoplastic piping system component connection ends, comprising:

securing means for securing the first and second piping system component connection ends in substantially abutted, axial alignment without positive axial pressure nd for preventing axial displacement of the piping system component connection ends during the fusion process;

a containment mandrel for surrounding the first and second piping system connection ends, substantially without positive pressure, over a thermally controlled region which includes (a) a melt region located substantially centrally therein and extending from the outside surfaces to the inside surfaces of said connection ends and (b) bilateral longitudinally adjacent portions on either side of said melt region;

centrally located heating means thermally coupled to said containment mandrel for applying thermal energy to heat said melt region at least to its material softening point;

first and second cooling means on either side of said centrally located heating means for dissipating heat to maintain said bilateral longitudinally adjacent portions at temperatures lower than the material softening point; and a pressurizable bladder internal to the first and second connection ends and extending bilaterally beyond the melt region;

said pressurizable bladder being pressurized to cooperate with (a) said containment mandrel and (b) said bilateral longitudinally adjacent portions of the connection ends which remain solid and held in place by said securing means to prevent the displacement of said melt region in all directions which would otherwise result from the thermal expansion of said melt region, whereby pressure is developed in the softened melt region to induce intermingling of the softened thermoplastic material of said melt region.

11. The fusion joining apparatus of claim 10 wherein said containment mandrel comprises metal having a thermal conductivity less than that of aluminum.

12. The fusion joining apparatus of claim 10 wherein said containment mandrel comprises aluminum.

13. The fusion joining apparatus of claim 10 wherein said first and second cooling means comprise cooling fins on either side of said centrally located heating means.

14. The fusion joining apparatus of claim 10 wherein said first and second cooling means comprise annular channels displaced from and on either side of said centrally located heating means for receiving forced fluid having a temperature less than the material softening point of the thermoplastic material of the melt region.

* * * * *

REEXAMINATION CERTIFICATE (2475th)

United States Patent [19]

Rianda

[11] B1 4,792,374

[45] Certificate Issued  Feb. 14, 1995

[54] APPARATUS FOR FUSION JOINING PLASTIC PIPE

[75] Inventor: Kent A. Rianda, Huntington Beach, Calif.

[73] Assignee: Georg Fischer AG, Schaffhusen, Switzerland

Reexamination Request:
No. 90/003,197, Sep. 17, 1993

Reexamination Certificate for:
Patent No.: 4,792,374
Issued: Dec. 20, 1988
Appl. No.: 34,895
Filed: Apr. 3, 1987

[51] Int. Cl.$^6$ .............................................. B29C 65/02
[52] U.S. Cl. ................... 156/503; 156/544; 156/556
[58] Field of Search ............... 165/154, 157, 179, 187

[56] References Cited

U.S. PATENT DOCUMENTS

| | | | |
|---|---|---|---|
| 2,675,054 | 4/1954 | Langer | 156/583.4 |
| 3,004,328 | 10/1961 | Pepper et al. | 165/182 |
| 3,687,194 | 8/1972 | Schöll | 165/182 X |
| 4,062,718 | 12/1977 | Hay, II | 156/583.4 X |
| 4,163,474 | 8/1979 | MacDonald et al. | 165/179 |
| 4,286,655 | 9/1981 | Trojani | 165/179 |

FOREIGN PATENT DOCUMENTS 0020915  1/1981  European Pat. Off. .

OTHER PUBLICATIONS

Handbook of Chemistry and Physics, 40th Edition, Chemical Rubber Publishing Co., 1958, p. 2431.

*Primary Examiner*—David A. Simmons

[57] ABSTRACT

Apparatus for butt-end joining two pieces of plastic pipe including an inflatable mandrel and heated clamping means for enclosing the abutted pipe ends over a first and second connection ends over the thermally controlled region which extends bilaterally beyond the melt region. This end-surrounding apparatus then cooperates both with a companion apparatus employed for the described internal support and with the unmelted longitudinally adjacent portions of the subject first and second connection ends both to prevent undesired deformational flow of melted component material and to bonding-conducively pressurize the softened component-to-component interface area.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-14 are cancelled.

* * * * *